United States Patent
Goyal et al.

(10) Patent No.: US 12,056,918 B1
(45) Date of Patent: Aug. 6, 2024

(54) METHODS AND APPARATUS FOR IDENTIFYING VIDEO-DERIVED DATA

(71) Applicant: Verkada Inc., San Mateo, CA (US)

(72) Inventors: Rishabh Goyal, San Mateo, CA (US); Song Cao, Foster City, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/477,280

(22) Filed: Sep. 28, 2023

(51) Int. Cl.
| | |
|---|---|
| G06V 10/94 | (2022.01) |
| G06F 16/71 | (2019.01) |
| G06F 16/75 | (2019.01) |
| G06V 10/82 | (2022.01) |
| G06V 20/40 | (2022.01) |
| G06V 20/52 | (2022.01) |
| H04N 5/262 | (2006.01) |
| H04N 7/18 | (2006.01) |

(52) U.S. Cl.
CPC ............ *G06V 10/945* (2022.01); *G06F 16/71* (2019.01); *G06F 16/75* (2019.01); *G06V 10/82* (2022.01); *G06V 20/41* (2022.01); *G06V 20/52* (2022.01); *H04N 5/2628* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 2004/0006628 | A1* | 1/2004 | Shepard | H04L 67/30 |
| | | | | 709/228 |
| 2012/0062732 | A1* | 3/2012 | Marman | G08B 13/19682 |
| | | | | 348/142 |
| 2015/0070587 | A1* | 3/2015 | Emeott | H04N 9/74 |
| | | | | 348/589 |
| 2016/0314354 | A1* | 10/2016 | Teuton | G06V 20/695 |
| 2017/0249386 | A1* | 8/2017 | Ostrovsky-Berman | |
| | | | | G06F 16/951 |
| 2017/0257612 | A1* | 9/2017 | Emeott | H04N 21/23418 |
| 2018/0365498 | A1* | 12/2018 | Teuton | G06V 20/49 |
| 2019/0236371 | A1* | 8/2019 | Boonmee | G06V 10/764 |
| 2021/0150235 | A1* | 5/2021 | Meskimen | B64D 11/0015 |
| 2021/0304736 | A1* | 9/2021 | Kothari | G06N 3/08 |
| 2023/0019211 | A1* | 1/2023 | Wang | G06V 10/811 |
| 2023/0351102 | A1* | 11/2023 | Tran | G06N 3/045 |

OTHER PUBLICATIONS

OPENAI: CLIP: Connecting text and images, retrieved from internet at https://openai.com/research/clip, on Dec. 28, 2023, 23 pages.
OPENAI: DALL-E 2, retrieved from internet at https://openai.com/dall-e-2, on Dec. 28, 2023, 17 pages.

* cited by examiner

Primary Examiner — Delomia L Gilliard
(74) Attorney, Agent, or Firm — COOLEY LLP

(57) ABSTRACT

A method for generating and selecting images of objects based on video data and text data includes receiving, at a processor of a video camera system, a video stream including a series of video frames depicting at least one object. A set of at least one classification for the object is generated. Additionally, an image that depicts the object and that includes a cropped portion of a video frame from the series of video frames is generated. A set of at least one index key is generated based on the set of at least one classification, and the image is stored based on the set of at least one index key. The processor receives a signal representing a text input from a user, and the processor performs at least one of (1) retrieval of the image or (2) generation of an alert.

20 Claims, 7 Drawing Sheets

METHODS AND APPARATUS FOR IDENTIFYING VIDEO-DERIVED DATA

CROSS-REFERENCE TO RELATED APPLICATION

This application is related to U.S. patent application Ser. No. 18/450,085, filed Aug. 15, 2023, and titled "Methods and Apparatus for Generating Images of Objects Detected in Video Camera Data," which is incorporated herein by reference in its entirety.

FIELD

The present disclosure generally relates to video surveillance, and more specifically, to systems and methods for identifying video-derived data based on text data.

BACKGROUND

Image processing techniques exist for object detection. Object detection can include the detection of depicted objects, such as people, or of depicted activities. Applications of object detection include, for example, video surveillance.

SUMMARY

In some embodiments, an apparatus includes a processor and a memory operably coupled to the processor. The memory stores instructions to cause the processor to receive a video stream including a series of video frames and to generate a set of at least one classification for an object depicted in at least one video frame from the series of video frames. The memory also stores instructions to cause the processor to generate an image that depicts the object and that includes a cropped portion of a video frame from the series of video frames. The memory also stores instructions to cause the processor to generate a set of at least one index key based on the set of at least one classification. Additionally, the memory stores the image based on the set of at least one index key. The memory also receives a signal representing a text input from a user and performs at least one of (1) retrieval of the image based on (a) at least one index key from the set of at least one index key and (b) the text input, or (2) generation of an alert based on (a) at least one classification from the set of at least one classification and (b) the text input.

In some embodiments, a non-transitory, processor-readable medium stores instructions that, when executed by a processor, cause the processor to receive a plurality of temporally arranged images, each image from the plurality of temporally arranged images including a depiction of an object. The non-transitory, processor-readable medium also stores instructions to generate a set of at least one identification for the object based on at least one image from the plurality of temporally arranged images. The non-transitory, processor-readable medium also stores instructions to generate a set of at least one cropped image, each cropped image from the set of at least one cropped image including a region of an image from the plurality of temporally arranged images and from a plurality of regions of that image, the image being different from each remaining image from the plurality of temporally arranged images, the region being smaller than an entirety of the image and depicting the object. The non-transitory, processor-readable medium also stores instructions to cause storage, in a memory operably coupled to the processor, of at least one cropped image from the set of at least one cropped image and a data structure that is (1) configured for use with a search operation, and (2) associated with a plurality of identifications that includes the set of at least one identification. Additionally, the non-transitory, processor-readable medium stores instructions to receive, from a compute device of a user, a signal that includes at least one identification from the set of at least one identification. The non-transitory, processor-readable medium also stores instructions to retrieve, using the search operation and the data structure, the at least one cropped image from the memory based on the signal. The non-transitory, processor-readable medium also stores instructions to cause transmission of the at least one cropped image to a remote compute device for display.

In some embodiments, a non-transitory, processor-readable medium storing instructions that, when executed by a processor, cause the processor to receive video-derived detection data associated with a plurality of objects. For each object from the plurality of objects, the non-transitory, processor-readable medium stores instructions to (1) generate a plurality of closeup images, each closeup image from the plurality of closeup images depicting an enlarged view of that object, and (2) cause storage of the plurality of closeup images in a database based on the video-derived detection data. The non-transitory, processor-readable medium also stores instructions to receive a text prompt that indicates a portion of the video-derived detection data, and search, in the database, for at least one closeup image that is from the plurality of closeup images and that is associated with the portion of the video-derived detection data. The non-transitory, processor-readable medium also stores instructions to cause transmission of at least one signal to cause display of the at least one closeup image via a user interface of a remote compute device.

DETAILED DESCRIPTION

Figure 1:
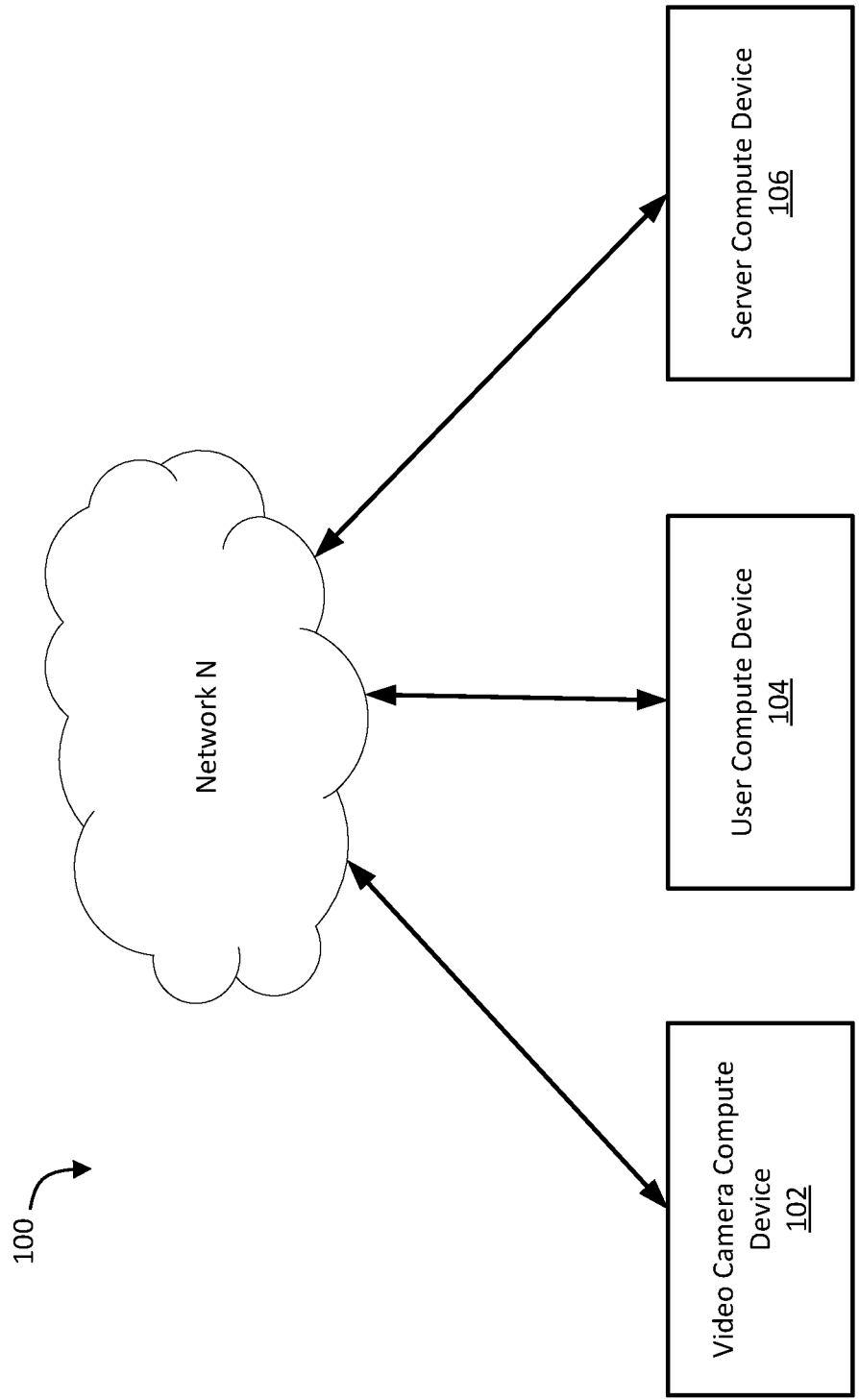
FIG. 1 is a system diagram showing a first example implementation of a system for generating and selecting images of objects based on video data and text data, according to some embodiments.

Video systems exist that are capable of performing object detection, for example, in applications such as facial recognition and license plate recognition. Such video systems, however, are not typically interactive (e.g., they do not typically take into account user inputs), and/or do not produce alerts or alarms in response to a particular object being detected. For example, many object detection processes are not computationally influenced by text data provided by a user. Moreover, such processes do not typically generate cropped images of an object based on such text data. Systems, methods, and apparatuses described herein, in contrast, generate cropped images (also referred to herein as "hyperzoom images" or "closeup images") and/or alerts based on object detection data, object motion data, and/or user inputs that include text data.

For example, in some embodiments, a compute device can be configured to receive a video stream from a video camera system, the video stream including a series of temporally arranged video frames. The compute device can be configured to detect (e.g., via a processor) an object that is depicted in the video stream. Detecting an object can include, for example, generating an identification (e.g., an identifier, classifier, and/or similar descriptors) for the object, generating a bounding box for the object, generating a classification for the object, classifying features of the object, segmenting a pixel(s) that depicts the object, and/or the like. The detecting (e.g., identifying, classifying, and/or generating an identification) can be performed by the processor using an image embedding model, which can include, for example, a neural network, such as a convolutional neural network (CNN), and/or any other algorithm configured for machine vision and/or classification tasks. As a result of the detecting, the compute device can be configured to generate embedded data (e.g., an embedding, a feature vector, and/or a numeric representation of image data) that is associated with the classification for the object. In some implementations, the embedded data can include an indication of an object type, an object sub-type, and/or an object characteristic. For example, for an object that is a human male wearing a red T-shirt, the corresponding embedded data generated as a result of identifying the human can include a human object type indication, a male object sub-type indication, and/or a red T-shirt characteristic indication.

In some implementations, the compute device can be configured to filter video data prior to classifying an object(s) depicted in the video data. For example, said filter can select a frame(s) from the video to provide to the image embedding model based on an object(s) of interest, object motion, and/or object activity depicted in the selected frame(s). In some instances, the filter can perform an initial classification of an object depicted in a video frame(s), and based on the initial classification, the compute device can be configured to use the image embedding model to perform a further classification(s) (e.g., feature detection) of the object depicted in the video frame(s) to generate the embedded data. In some implementations, the filter can be configured to calculate a motion associated with the object and characterize said motion (e.g., by associating said motion with a confirmed motion track, as described herein). Based on the confirmed motion track and/or the generated object identification/classification, the compute device can be configured to generate embedding image data using the image embedding model. The filter can improve resource utilization and/or performance, for example, by down-selecting the video frame data processed using the image embedding model.

In some implementations, the image embedding model can be configured to generate embedded data based on a plurality of received video frames, where the embedded data includes a representation of an activity performed by an object and depicted across the plurality of video frames. For example, the image embedding model can include at least one convolutional neural network and/or at least one recurrent neural network and can be configured to receive as input a plurality of temporally arranged video frames. An activity performed by an object can include, for example, a person peering through a window or using a flashlight to search for an item.

Based on the embedded data generated by the image embedding model, the compute device can be configured to generate a cropped image(s) of the object. The cropped image(s) can be generated from a cropped region(s) of the video frame(s) that depict the object. The cropped image(s) can be stored in a memory (e.g., a database, remote server, remote object store, and/or the like) according to an index key associated with the classification. An index key can include, for example, a pointer from a plurality of pointers that is configured to organize, lookup, and/or locate stored data. In some implementations, the index key can include, for example, a hash of the classification, or any other indication that facilitates the search and retrieval of the associated cropped image(s) from the memory. For example, an index key can be associated with value, where the index key is generated using a hash function and the value is associated with a cropped image(s). In addition to the cropped image(s), metadata can also be stored in the memory according to the associated index key. The metadata can include, for example, the associated embedded data generated by the image embedding model and/or an associated timestamp(s).

In some instances, the compute device can be configured to store the video frame(s) (e.g., an uncropped image(s) and/or a full image(s)) in addition to the cropped image(s). For example, a video frame can depict a scene (e.g., a complex scene) that includes a plurality of objects of interest. The video frame(s) depicting the scene can be stored (e.g., indexed in a memory) in addition to cropped images that each depict an individual object from the plurality of objects within the scene. In some implementations, a video frame can be indexed based on a classification(s) (e.g., an index or indices) associated with a cropped image(s) generated from that video frame. In some implementations, a classification (e.g., "three people walking with a dog") associated with the scene depicted by a video frame can be stored, such that the scene can be indexed based on the scene classification for subsequent retrieval. The video frame(s) and the cropped images can be retrieved from the memory based on a text description, as described herein. In some instances, the video frame can have a large data size and/or a high resolution. To preserve resolution of the objects of interest, cropped images of each respective object from the plurality of objects of interest can have a higher resolution, and the video frame depicting the scene can be down-sampled to have a lower resolution. As a result, resource usage can be reduced.

The compute device can be further configured to receive a text input (e.g., a natural language description, text data, a sequence of characters, data associated with a string data-type, and/or a text prompt including one or more words, phrases, and/or sentences). A processor included in the compute device can be configured to use a language embedding model (e.g., a neural network, a transformer network, a convolutional neural network, and/or the like) to generate embedded (e.g., embedded) text data. The embedded/embedded text data can be associated with a feature space/ latent space that is equivalent or substantially equivalent to a feature space/latent space associated with the embedded data associated with the object identification and generated from the video stream. A latent space (e.g., embedding space) can include an abstract, multi-dimensional space that can encode (e.g., numerically) a semantic representation of observable/human perceivable data (e.g., text data, image data, etc.). A position within the latent space can be defined by a set of latent variables that emerge from the resemblances of objects encoded by the embedded data. For example, objects/features with similarities can be positioned within the latent space (as defined by the respective embedded data) closer than objects/features with no similarities or fewer similarities.

In some instances, a training framework can be used to jointly train (e.g., co-train) the language embedding model and the image embedding model. For example, the training framework can be configured to adjust one or more weight values associated with each of the language embedding model and image embedding model, where the adjusting of the one or more weight values of the language embedding model depends on the adjusting of the one or more weight values of the image embedding model, and the adjusting of the one or more weight values of the image embedding model depends on the adjusting of the one or more weight values of the language embedding model. In some implementations, the neural network training framework can include a utility (e.g., aa software application, a graphical user interface and/or the like) for use in monitoring how well an untrained neural network is converging towards a model, such as trained neural network, that can generate a prediction(s) having sufficient accuracy as compared to input data (e.g., new data and/or validation data). In some implementations, the neural network training framework can train an untrained neural network repeatedly and/or iteratively, adjusting weights to refine an output(s) of the untrained neural network based on, for example, a loss function and an adjustment algorithm (e.g., stochastic gradient descent). In some implementations, the neural network training framework can train the untrained neural network until the untrained neural network achieves a desired accuracy. This desired (or selected, or predefined) accuracy can be, for example, 100%, less than 100%, less than 90%, less, than 80%, and/or the like.

As a result of the joint training of the language embedding model and the image embedding model, the embedded text data and embedded classification (generated by the respective models) can be compared. For example, based on a text prompt "person riding a bike," the language embedding model can generate embedded text data that represents that text prompt. The image embedding model can generate a classification "person riding a bike" based on video data that portrays a person riding a bike. This classification, represented by embedded classification data, can be represented in the same feature space as the embedded text data, such that the classification and the embedded text data can be compared. For example, the image embedding model and the language embedding model can be trained (e.g., co-trained) such that embedded text data (e.g., text embeddings) lie closer (e.g., in embedding space) to embedded image data (e.g., image embeddings) that are described, substantially described, or described in part by text associated with the embedded text data as compared to embedded image data that is unrelated, substantially unrelated, or less related to the embedded text data.

The compute device can be configured to transmit the cropped image(s) to a user compute device based on the comparison between the classification and the embedded text data. In some instances, the embedded text data generated by the language embedding model can be stored by the compute device as a user-defined preference. As a result, any received video data that depicts an object/object activity and causes the image embedding model to generate embedded data that is equivalent or substantially equivalent to the stored embedded text data can cause cropped image(s) of the object/object activity to be transmitted (e.g., automatically) to the user compute device. In some instances, the user can input a text prompt to search for a cropped image(s) that was previously generated from video data and stored in a memory (e.g., the database described herein). In response to receiving the text prompt from the user compute device, the compute device can be configured to retrieve the cropped image(s) from the database that is associated with embedded data (e.g., a classification(s)) that is equivalent or substantially equivalent to embedded text data generated from the text prompt. Specifically, the embedded text data can be used to search for the image in the database based on the associated index key. For example, the embedded text data can be compared to a plurality of indices included in the database, or a hash or some other transformation of the embedded text data can be compared to the plurality of indices. Based on the comparison, an index that is equivalent or substantially equivalent to the embedded text data (or a hash of the embedded text data) can indicate that the associated cropped image(s) corresponds/matches to the embedded text data (and, therefore, to the text prompt). In some instances, the text prompt and/or a user setting can include an indication of a date, time, date range, and/or time range, and the retrieved image can be associated with a timestamp included in or matching to that date, time, date range, and/or time range.

The compute device, as part of the video camera system, can be local to a video camera (e.g., co-located within a common housing) or remote from a video camera (e.g., external from the common housing). User inputs made via the compute device can be communicated to the video camera system and/or used by the video camera system during its operations, e.g., in the context of one or more video monitoring operations. Based on a match between stored embedded text data and embedded data generated from received video data, an alert or alarm may be generated (optionally as part of the video monitoring operations and/or automatically) by the video camera system or the user compute device and can be communicated to the user and/or to one or more other compute devices. The alert or alarm can be communicated, for example, via a software "dashboard" displayed via a GUI of one or more compute devices operably coupled to or part of the video camera system. The alert or alarm functionality can be performed by an "alarm system." In some implementations, the image embedding model can be trained, using a security domain-specific supervising signal, to classify an object(s) depicted in received image/video data as being of interest and/or associated with a potential security threat, trespass, and/or the like. For example, the security domain-specific supervising signal can be configured to train the image embedding model to generate the alert based on a depicted object(s) and/or activity commonly associated with a security threat (e.g., a person loitering within a property boundary, a dog digging in a yard, etc.).

As used herein, "object motion" can have an associated sensitivity value or range, which may be user-defined/adjusted and/or automatically defined. A deviation of one or more parameters within or beyond the associated sensitivity may register as object motion. The one or more parameters can include, by way of non-limiting example, and with respect to a pixel(s) associated with the object, one or more of: a difference in a pixel appearance, a percentage change in light intensity for a region or pixel(s), an amount of change in light intensity for a region or pixel(s), an amount of change in a direction of light for a region or pixel(s), etc.

In some embodiments, the detection of object motion can be based on semantic data. Stated another way, the object motion may be tracked based on the type of object (e.g., as represented by embedded image data) that is changing within the field of view of the video camera. In some implementations, a different motion model and/or a uniquely parameterized and/or modified motion model can be used to detect the object motion based on semantic data, as described herein.

In some embodiments, the processing involved as part of cropped image generation occurs at/on a video camera (also referred to herein as an "edge device") itself, such as a security camera/surveillance camera. For example, one or more methods described herein can be implemented in code that is onboard the video camera. In some implementations, the processing can occur at each device on an edge of a network. (e.g., distant from a core (e.g., a server computer device) and without another device connected to it. The code can include instructions to automatically classify at least one object that is depicted in a series of video frames (e.g., a video clip). In some implementations, the series of video frames may include a series of temporally arranged compressed images (e.g., down sampled images and/or images that are reduced in size and/or pixel resolution). For example, the video camera may capture video data (e.g., a series of uncompressed and/or high-resolution video frames) and the compute device can compress the video data to generate the series of temporally arranged compressed images. The compute device can be configured to identify an occurrence of an object that is depicted within a compressed image from the series of temporally arranged compressed images. The occurrence can be represented in, for example, video-derived detection data. In some implementations, the compute device can include a processor that is configured to use a neural network (e.g., a convolutional neural network (CNN) adapted for image recognition) to identify the occurrence of the object (i.e., to generate the classification for the object).

As a result of identifying the occurrence of an object, the compute device can be configured to calculate motion associated with the object occurrence. For example, the compute device can be configured to calculate the motion based on whether the identified/classified object is an object of interest (e.g., a human, a vehicle, a dog, etc.) or is not an object of interest (e.g., a bird, an insect, a wind-blown tree, etc.). The compute device can be further configured to select a motion model from a plurality of motion models based on the object identification/classification, where the selected model is configured (e.g., parameterized) for the identified object type. Calculating motion can include assigning the object occurrence to a motion track (e.g., assigning an object detection to one track ID from a set of track IDs). For example, the object occurrence detected within a compressed image can be associated with an additional object occurrence(s) (i.e., an object occurrence(s) included in historical video-derived detection data) detected in previous compressed images from the series of temporally arranged compressed images. The compute device can determine that a current object occurrence is associated with a previous object occurrence(s) (e.g., the object being the same for all occurrences) based on a motion model that generates an expected motion for an object. This expected motion generated by the motion model can be compared to the objects actual location as inferred by the objects position within a later compressed image from the series of temporally arranged compressed images.

In some implementations, the motion model can include a Kalman filter and/or a suitable tracking filter (e.g., a linear Kalman filter, an extended Kalman filter, an unscented Kalman filter, a cubature Kalman filter, a particle filter, and/or the like). For example, a linear Kalman filter can be used when an object exhibits dynamic motion that can be described by a linear model and the detections (i.e., measurements) are associated with linear functions of a state vector. In some implementations, the compute device can select a Kalman filter from a plurality of Kalman filters based on the object identification, where each Kalman filter is parameterized based on the type of object (e.g., car, human, etc.) represented by the identification. Each type of object, for example, can be associated with a nominal motion that is described by the respective Kalman filter.

Based on expected motion generated by the motion model, the compute device can be configured to automatically generate and/or automatically update a stored motion track (e.g., a motion track record) that is associated with the object. A motion track can include, for example, a set of object detection(s) and the time(s) and/or video frame(s) at which the detection(s) was recorded. For example, a plurality of objects can be depicted in video data, and each object from the plurality of objects can have an associated motion. In some instances, at least two of these objects can be associated with the same identification (e.g., the objects can include two different humans in close proximity to one another). To determine whether object detections in two or more compressed images from the series of temporally arranged compressed images are associated with a single/individual object in motion or two different objects, the motion model can determine a likelihood and/or feasibility that the depictions of the object(s) are the result of motion of one object or are the result of the detections being associated with a plurality of objects. In some implementations, the two or more compressed images can each be associated with a time stamp. These time stamps can be used to determine whether an object of a specified type (as determined by the identification) could feasibly undergo motion within a time period defined by the time stamps to result in a change in location depicted between the two or more compressed images. For example, the motion model can be configured to differentiate between (1) two humans appearing in different locations within different frames and (2) an individual human in motion, based at least in part on an average, probable, and/or possible human running speed.

An object detection can be added to an existing motion track if the motion model indicates that the object's displacement within a compressed image is possible and/or feasible based on a motion estimate generated by the motion model for an earlier object detection from a previous compressed image. If the object detection cannot be matched to an existing motion track, a new motion track can be generated for the object, and subsequent detections of the object in later compressed images can be added to that motion track based on the motion model.

A motion track can be confirmed based on the number of object detections that are added to that track (i.e., the length of the track and/or a density/number of object detections of the track) and/or based on a confidence of the detections that are added to the track (i.e., a likelihood that an object is of a type represented by the generated identification). For example, a motion track can remain unconfirmed until a predefined number of (e.g., two or more) object detections from a predefined number of (e.g., two or more) compressed images have been added to the motion track. In some implementations, a motion track can remain unconfirmed until two or more object detections that each has a confidence above a predefined threshold are added to the motion track. A motion track can be deleted based on a length of time and/or a number of successive compressed images that does not have associated with it an object detection that is added to the motion track.

Motion tracking based on streamed video frames generated by the video camera can be performed continuously, iteratively, according to a predefined interval or schedule (e.g., regularly), and/or according to a predefined schedule.

FIG. 1 is a system diagram showing an example implementation of an object detection system 100 for generating and selecting images of objects based on video data and text data, according to some embodiments. The object detection system 100 includes a video camera compute device 102, a user compute device 104, and a server compute device 106. These compute devices can be communicatively coupled to one another via the network N.

As described herein, the video camera compute device 102 can be configured to retrieve video data, which can include video stream data and/or a series of temporally arranged images. Video data can include a video frame that can depict, by way of example, a human within the field of view of a video camera that can generate the video data. The video frame can further depict, by way of example, a parked car. An identification can be generated for the human, and the identification can be associated with a motion track based on the identification, a motion model (e.g., a Kalman filter), and/or previous identifications from previous video frames from the video data. An identification can also be generated for the parked vehicle and can be prevented from being assigned to a motion track based on this identification and a lack of motion associated with the parked car.

The video camera compute device 102 can be further configured to generate a cropped image(s) of a depicted object based on the identification and/or the motion track. In some implementations, the cropped image(s) can be generated from uncompressed video data (e.g., an uncompressed video frame), such that the cropped image depicts an object with an original resolution. Based on the cropped image, the video camera compute device 102 can be configured to generate richer/more complex feature descriptions of the depicted object, representing these feature descriptions using embedded data (e.g., a feature vector(s)). The feature descriptions can be associated with, for example, an article of clothing (e.g., a color of clothing), an activity being performed by the object (e.g., a human peering through a window or a dog barking on a lawn), and/or an object sub-type (e.g., a human male, a golden retriever, or a pickup truck). The video camera compute device 102 can cause at least one of the cropped image(s), the embedded data, and/or a compressed or uncompressed video frame(s) associated with the cropped image(s) to be stored in a memory associated with the server compute device 106. In some implementations, the cropped image(s) and/or the compressed/uncompressed video frame(s) can be stored such that the cropped image(s) and/or the compressed/uncompressed video frame(s) can be retrieved based on the associated embedded data.

The user compute device 104 can be configured to, by way of example, generate/set an alert that is sent to the user and that can be triggered when an object of interest is identified in video data received by the video camera compute device 102. The user can describe the object of interest, including object features of interest, using a text/semantic prompt, as described herein. Alternatively or in addition to, the user compute device 104 can be configured to allow a user to perform an investigative search of video data stored at the server compute device 106. For example, a user can perform an initial general search by inputting a first text phrase (e.g., a linguistic phrase such as "person riding a bike"). In response, the user compute device 104 can display any photo stored at the server compute device 106 and associated with embedded data that describes or is related to a person riding a bike. A user can then refine the search by providing a second text phrase (e.g., "person wearing black hoodie and riding a bike") that is, for example, more specific than the first text phrase, to cause a subset of photos that are related to the second text phrase to be identified and returned.

Figure 2:
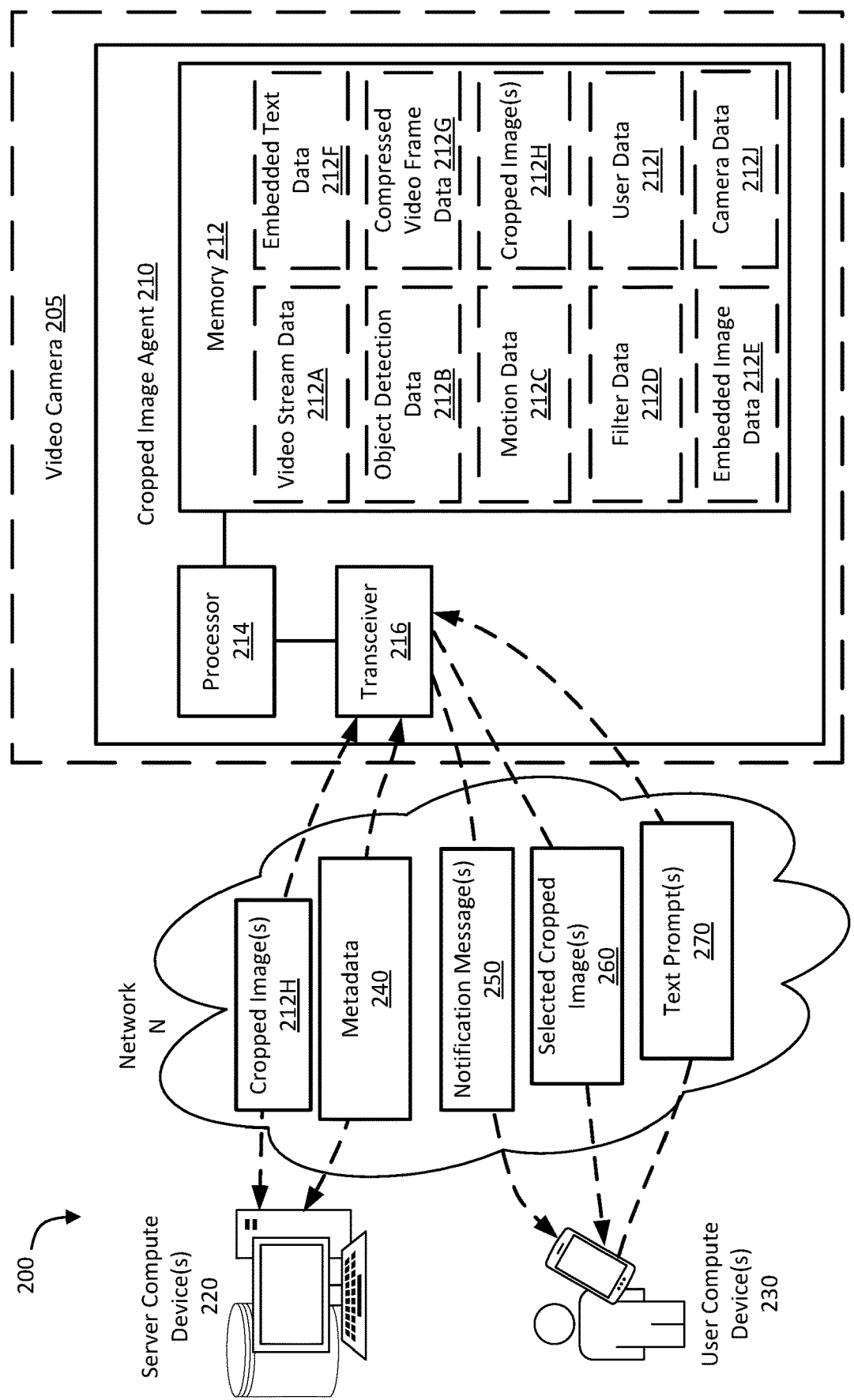
FIG. 2 is a system diagram showing a second example implementation of a system for generating and selecting images of objects based on video data and text data, according to some embodiments.

FIG. 2 is a system diagram showing an example implementation of an object detection system 200 for generating and selecting images of objects based on video data and text data, according to some embodiments. As shown in FIG. 2, the cropped image agent 210 includes a processor 214 operably coupled to a memory 212 and a transceiver 216. The cropped image agent 210 is optionally located within, co-located with, located on, in communication with, or as part of a video camera 205. The memory 212 stores one or more of video stream data 212A, object detection data 212B, motion data 212C, filter data 212D, embedded image data 212E, embedded text data 212F, compressed video frame data 212G, cropped image(s) 212H, user data 212I, or camera data 212J.

The video stream data 212A can include, by way of example only, one or more of video imagery, date/time information, stream rate, originating internet protocol (IP) address, etc. The object detection data 212B can include, by way of example only, an object classification(s) to determine an object(s) of interest. The motion data 212C can include, by way of example, at least one of an unconfirmed motion track or a confirmed motion track. The motion data 212C can further include a time and/or a number of sequential video frames that an object has been depicted and/or detected in. The motion data 212C can further include a time and/or a number of video frames since an object detection has occurred (e.g., a time period during which there was an absence/lack of object detection). The filter data 212D can include, by way of example, an indication(s) of one or more objects of interest, activities of interest, or a motion threshold(s). The filter data can be used to select a video frame(s) for further processing using an image embedding model, as described herein.

The embedded image data 212E can include, by way of example, an identified feature(s) (e.g., a color of clothing or an activity being performed) of the object depicted in a cropped image. The embedded image data 212E can be represented by, for example, a feature vector (e.g., a numerical representation of an object depicted in video data). The embedded text data 212F can include a numerical representation (e.g., a feature vector) of a text prompt(s) received from a user. The compressed video frame data 212G can include, by way of example, lossy video frame data generated from the video stream data 212A, the compressed video frame data 212G having a lower resolution than the video frames included in the video stream data 212A. The cropped image(s) 212H can include, by way of example, imagery/ image data depicting an object associated with the filter data 212D. The cropped image(s) 212H can be generated from the video stream data 212A.

The user data 212I can include, by way of example only, one or more of user identifier(s), user name(s), user location(s), and user credential(s). The user data 212I can also include, by way of example, cropped image transmission frequency, cropped image count per transmission and/or period of time, capture frequency, desired frame rate(s), sensitivity/sensitivities (e.g., associated with each from a plurality of parameters), notification frequency preferences, notification type preferences, camera setting preference(s), etc. The user data 212I can further include one or more stored text prompts and/or store embedded text data (e.g., stored embeddings) previously received from a user and indicating an object(s) of interest to the user. The camera data 212J can include, by way of example only, one or more of camera model data, camera type, camera setting(s), camera age, and camera location(s).

The cropped image agent 210 and/or the video camera 205 is communicatively coupled, via the transceiver 216 and via a wired or wireless communications network "N," to one or more remote (relative to the video camera 205) compute devices (e.g., each including a processor, memory, and transceiver). The one or more compute devices can include the server compute device(s) 220 and the user compute device(s) 230. The user compute device(s) 230 can include, for example, a workstation(s), desktop computer(s), mobile device(s) (cell phone(s), smartphone(s), laptop computer(s), tablet(s), or wearable(s). During operation of the cropped image agent 210, and in response to detecting an object(s) and/or feature(s) of interest and/or motion of interest, and/or in response to generating a cropped image(s), notification message(s) 250 can be automatically generated and sent to the user compute device(s) 230 based on the user data 212I. The notification message(s) 250 can include, by way of example only, one or more of an alert, semantic label(s) representing the type(s) of object(s) and/or feature(s), and/or motion detected, time stamps associated with the cropped image(s) 212H, etc. Alternatively or in addition, cropped image(s) 212H can be automatically sent to the server compute device(s) 220 in response to detecting an object and/or motion. In some implementations, metadata 240 can also be transmitted to the server compute device(s) 220 in response to detecting an object and/or motion. The metadata 240 can include, by way of example, an indication of a time period (e.g., a data range). In response to receiving a text prompt(s) 270 sent via the user compute device(s) 230, the cropped image agent 210 can be configured to send, via the transceiver 216, the selected cropped image(s) 260 to the user compute device(s) 230. For example, the cropped image agent 210 can be configured to retrieve any cropped images that are associated with embedded image data that is equivalent, substantially equivalent, or related to embedded text data generated from the received text prompt. Such cropped images can be included in the selected cropped image(s) 260 that are transmitted to the user device(s) 230.

Figure 3:
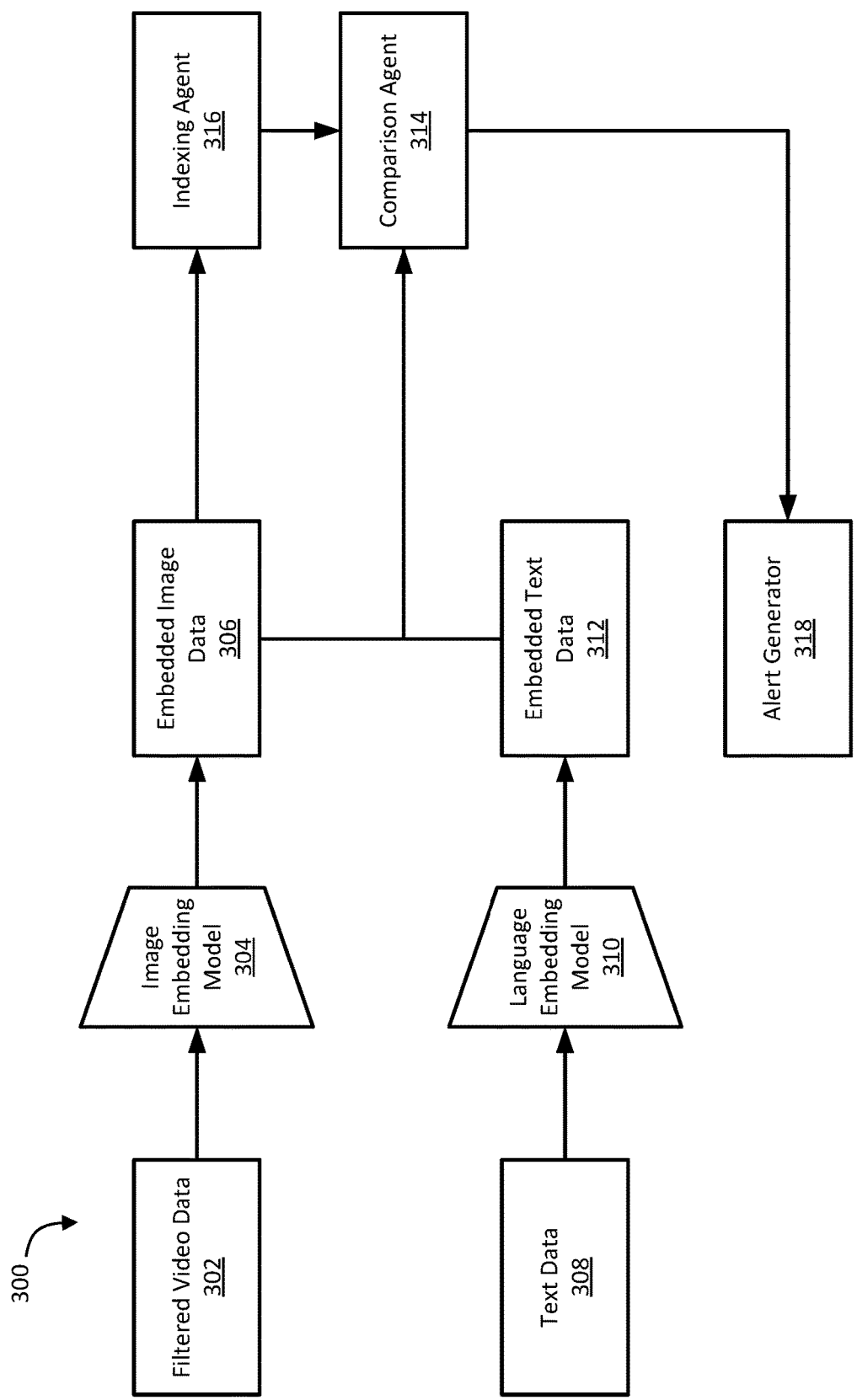
FIG. 3 is a system diagram showing a third example implementation of a system for generating and selecting images of objects based on video data and text data, according to some embodiments.

FIG. 3 is a system diagram showing an example system 300 for generating and selecting images of objects based on video data and text data, according to some embodiments. The system 300 can be included, for example, in the object detection system 200 of FIG. 2 and/or the object detection system 100 of FIG. 1. As shown in FIG. 3, the system 300 uses, as input, filtered video data 302 collected/captured via, by way of example, a video camera. The system 300 also uses, as input, text data 308 collected from a user via, by way of example, a graphical user interface. The filtered video data 302 can include portions of video imagery/data (e.g., portions that are pertinent to object and/or activity detection, such as date/time information, video frame numbers, short-duration video clips, etc.) that can be streamed to the image embedding model 304. In some instances, the filtered video data 302 can include an image that depicts an object of interest. In some instances, the filtered video data 302 can include a plurality of temporally arranged images that collectively depict an object performing an activity of interest. In some instances, the filtered video data 302 can include a cropped image(s) of an object of interest and/or a video frame that depicts a scene that includes an object of interest, as described herein.

The image embedding model 304 can include one or more neural networks and/or one or more models suitable for use in machine vision. For example, the image embedding model 304 can include one or more convolutional neural networks that are configured to perform at least one of object detection, feature detection, or image segmentation. The image embedding model 304 can be configured to generate embedded image data 306. The embedded image data 306 can include, for example, one or more feature vectors and/or a numerical representation(s) of an object(s), feature(s), and/or one or more activities depicted in the filtered video data 302. Said differently, the image embedding model 304 can be configured to embed the filtered video data 302 into a feature space that has reduced dimensions than the image/video space for the filtered video data. In some instances, although not shown in FIG. 3, the image embedding model 304 can include a plurality of models. For example, in some implementations, the image embedding model 304 can include a first model configured to detect a feature(s) of an object(s) of interest and a second model configured to detect an activity performed by an object(s) of interest.

The indexing agent 316 can be implemented in hardware and/or software, and can be configured to store the filtered video data 302 and the embedded image data 306 in a database (e.g., an Amazon® Dynamo database), such that the filtered video data 302 can later be transmitted to and/or retrieved by a remote compute device. In some instances, the indexing agent 316 can be configured to store the filtered video data 302 (or a portion of the filtered video data 302) such that it can be retrieved based on the embedded image data 306. For example, the filtered video data 302 can be stored based on one or more indices associated with the embedded image data 306 (e.g., a classification(s) represented by the embedded image data 306). The indexing agent 316 can be further configured to store, in the database, metadata associated with the filtered video data. The metadata can include, by way of example, an indication of a time period (e.g., a data range). The indexing agent can use this metadata to, for example, retrieve the associated filtered video data 302 from the database if an indicated time period (e.g., as provided by the user) includes and/or is associated with the time period indicated by the metadata.

The text data 308 can include at least one of a natural language word(s) or phrase(s). The language embedding model 310 can use the text data 308 to generate embedded text data 312. The language embedding model 310 can include, for example, a transformer model, a recurrent neural network, a convolutional neural network, and/or any other model configured to perform natural language processing. The embedded text data can include a representation of the text data 308 in a reduced (as compared to the text space of the text data 308) dimension space. For example, the embedded text data can include a projection of the text data into a latent vector, where the latent vector is a compact representation of the text data. The latent vector can indicate a location/position within the latent space, and the position relative to the positions of other latent vectors (e.g., latent vectors associated with other text data) can indicate a similarity between the text data and the other text data. Training of he text embedding model can be configured to fit the latent space for text data, and training of the image embedding model can be configured to fit the latent space for image data. The trained embedding models can use the respective latent spaces as feature spaces to generate predictions. In some implementations, the embedded text data can include a numerical representation of the text data, where the numerical representation has a smaller data size than the text data. This reduced dimension space can be associated with the reduced dimension space of the embedded image data 306. For example, in some implementations, the reduced dimension space associated with the embedded text data 312 can be equivalent or substantially equivalent to the reduced dimension space associated with the embedded image data 306. Said differently, the respective reduced dimension spaces (e.g., latent spaces) associated with each of the embedded image data 306 and the embedded text data 312 can be configured such that the embedded image data 306 and the embedded text data 312 can be compared (e.g., via the comparison agent 314).

The comparison agent 314 can be implemented in hardware and/or software, and can be configured to determine whether at least a portion of the embedded image data 306 and at least a portion of the embedded text data 312 are associated with one another, equivalent to one another, or substantially equivalent to one another. In use, the comparison agent 314 can be used to determine whether the text data 308 describes an object and/or activity depicted in the filtered video data 302 by comparing the embedded text data 312 with the embedded image data 306. By way of example, the comparison agent 314 can determine that the filtered video data depicts a person peering through a window and that the text data 308 describes, in natural language, a person peering through a window.

The system 300 can be configured to use the comparison agent 314 according to at least two different processes. Under the first process, the comparison agent 314 can receive the embedded text data 312 prior to the system 300 receiving the filtered video data 302. For example, a user can indicate, via the text data 308, an object(s) and/or at least one activity of interest that the user wishes to monitor and/or be alerted of. The system 300 can convert this text data 308, via the language embedding model 310, to embedded text data 312. This embedded text data 312 can then be stored in a memory (e.g., the memory 212 of FIG. 2) associated with the system 300, such that the embedded text data 312 can be referenced by the comparison agent 314. Subsequently, the comparison agent 314 can compare any embedded image data 306 received from the image embedding model 304 to the stored embedded text data 312. In doing so, the comparison agent 314 can be used to determine whether any filtered video data 302, received contemporaneously as to the determining, depicts an object(s) and/or at least one activity represented by the stored embedded text data 312.

Under the second process, which the system 300 can implement alternatively or in addition to the first process, the comparison agent 314 can be used to query a database that stores previously captured images and/or video clips/segments (e.g., the filtered video data 302 or a portion(s) of the filtered video data 302). For example, upon receiving text data 308 from a user and generating the embedded text data 312 using the language embedding model 310, the comparison agent 314 can use the embedded text data 312 to search for any associated images/video data based on the embedded image data 306, which is also stored in the database using the indexing agent 316. For example, the comparison agent can retrieve and/or return any images and/or video associated with embedded image data 306 that is associated with, equivalent to, or substantially equivalent to the embedded text data 312. Said differently, the comparison agent 314 can compare text data 308, received contemporaneously to the comparing, to previously captured filtered video data 302. In some implementations, the comparison agent 314 can be configured to return image/video data stored in a database if metadata that is stored in the database and that includes at least one timestamp (e.g., a date/time indicating when the image/video was captured) is within a date/time range indicated by the user.

Based on the comparison agent 314 determining an association between the embedded image data 306 and the embedded text data 312, the alert generator 318 can be configured to provide a notification(s) to the user. A notification(s) can include, by way of example only, one or more of an alert, semantic label(s) representing the type(s) of object(s) and/or feature(s), and/or motion detected, time stamps associated with the filtered video data 302, etc.

Figure 4:
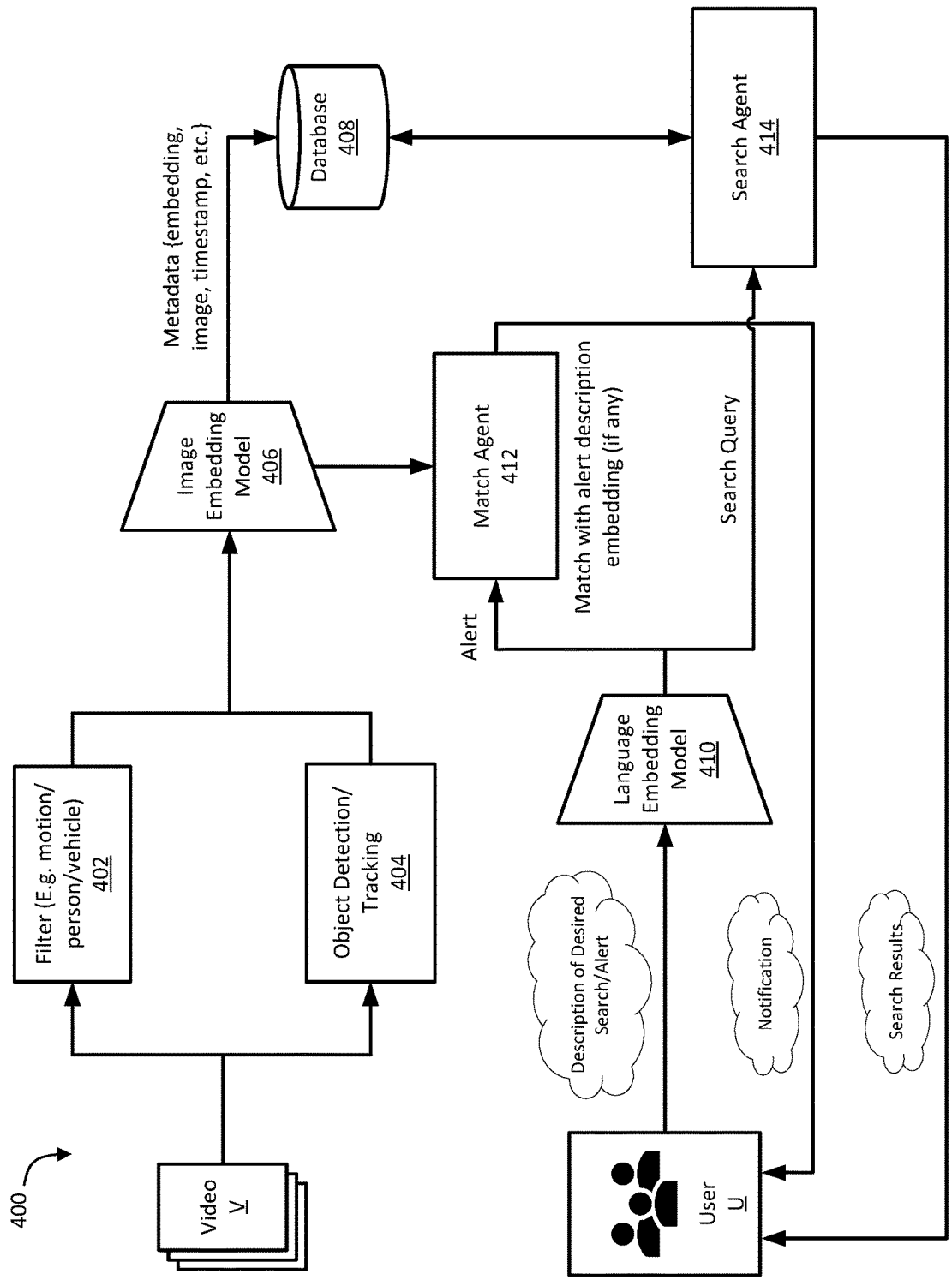
FIG. 4 is a system diagram showing a fourth example implementation of a system for generating and selecting images of objects based on video data and text data, according to some embodiments.

FIG. 4 is a system diagram showing an example system 400 for generating and selecting images of objects based on video data and text data, according to some embodiments. The system 400 can be included, for example, in the system 300 of FIG. 3, the object detection system 200 of FIG. 2, and/or the object detection system 100 of FIG. 1. The system 400 can be configured to use the object detection/tracking agent 404 to detect and/or classify an object depicted in the video imagery/data V and generate detection data (e.g., an object identification, a feature identification, a bounding box, a frame position, etc.). The object detection/tracking agent 404 can further generate tracking data by tracking an object in motion and assigning the object to a motion track, as described herein. The filter 402 can selectively include at least a portion (e.g., a segment(s)) of the video imagery/data V to be provided as input to the image embedding model 406. For example, the filter 402 can select the portion(s) of the video imagery/data V based on whether the portion(s) depicts motion and/or an object(s) of interest (e.g., a person, vehicle, etc.).

The image embedding model 406 can be, for example, the image embedding model 304 of FIG. 3. The image embedding model 406 can be used to generate metadata from the video imagery/data V. The metadata can include, by way of example only, embedded data (e.g., an embedding) associated with the video imagery/data V, an image(s) associated with the video imagery/data V, a timestamp(s) associated with the video imagery/data V, etc. The system 400 can be configured to store the metadata in a database 408.

The system 400 can be further configured to receive, from a user U, a text input that describes a search and/or alert request. This request can represent, for example, a user's preference/desire to be alerted of any segment(s) of video imagery/data V that depicts a specified object and/or activity. A language embedding model 410 can receive this text input and generate embedded data that represents the request/description represented by the text input.

If the text input is associated with an alert request from the user U, the match agent 412 can be used to determine if any embeddings generated by the image embedding model 406 are associated with an embedding(s) generated by the language embedding model 410. If the match agent 412 determines that the embeddings generated by the respective models are associated with one another, the match agent 412 can cause a notification/alert to be transmitted to the user U.

If the text input is associated with a search request from the user U, the search agent 414 can be used to determine if any embeddings generated by the image embedding model 406 and stored in the database 408 are associated with an embedding(s) generated by the language embedding model 410. If the match agent 412 determines that the embeddings generated by the respective models are associated with one another, the search agent 414 can cause a search result to be transmitted to the user U. The search result can include, by way of example only, the image(s) and/or segment(s) of the video imagery/data stored in the database 408 and associated with the embedding generated by the image embedding model 406 and relevant to the text prompt (as determined by the search agent 414). Said differently, the search agent 414 can be configured to search for images retrospectively (as to the generation of the images) based on the user's search query.

Figure 5:
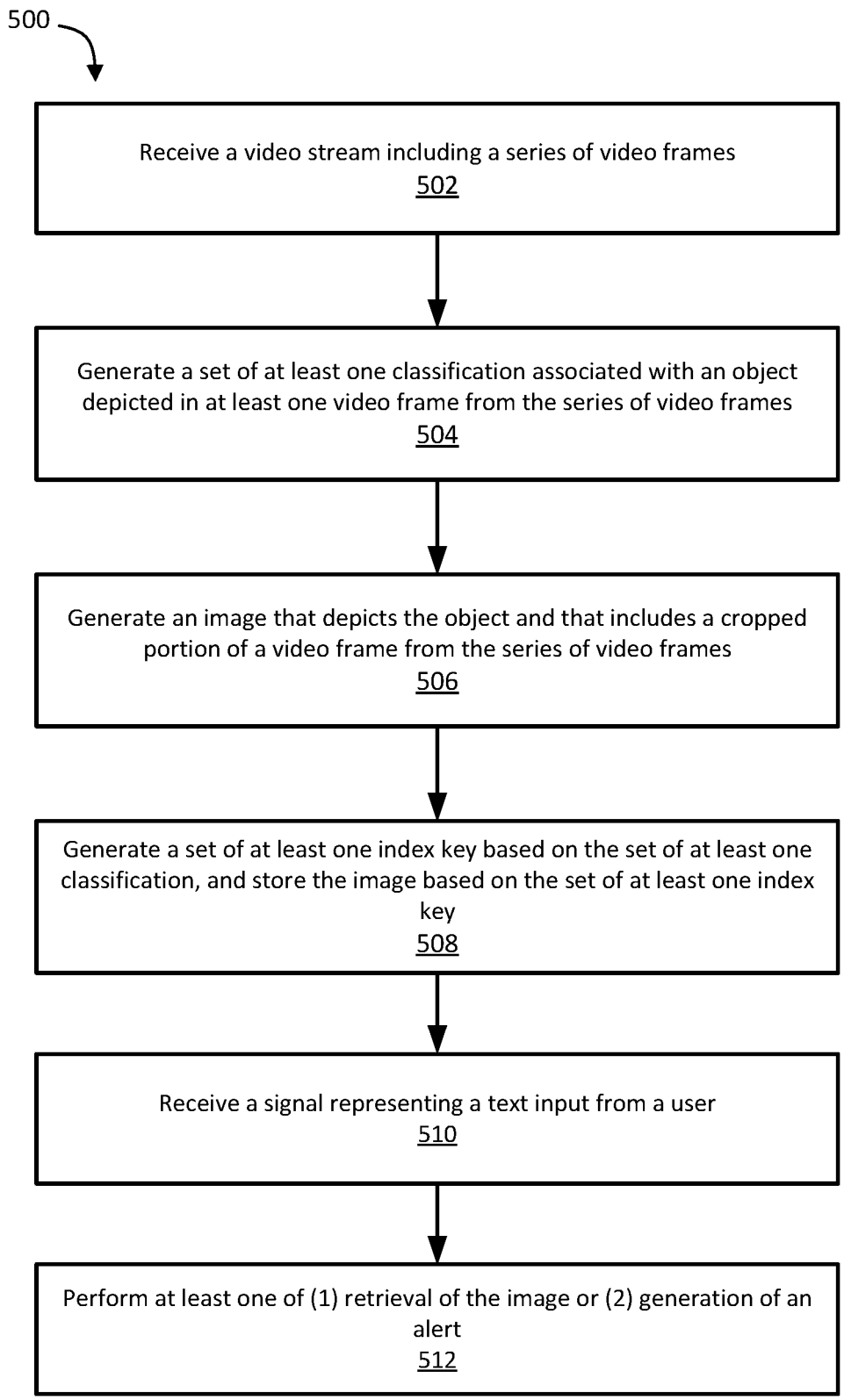
FIG. 5 is a flow diagram showing a first method for generating and selecting images of objects based on video data and text data, according to some embodiments.

FIG. 5 is a flow diagram showing a first method 500 for generating and selecting images of objects based on video data and text data, according to some embodiments. The method 500 can be implemented, for example, using the object detection system 100 of FIG. 1. As shown in FIG. 5, the method 500 includes receiving, at 502, at a processor of a video camera system, a video stream including a series of video frames depicting at least one object. The series of video frames can include consecutive video frames and/or non-consecutive video frames. At 504, a set of at least one classification for the object is generated, via the processor of the video camera system. The method 500 also includes, at 506, in response to the generating at 504, generating an image that depicts the object and that includes a cropped portion of a video frame from the series of video frames. At 508, a set of at least one index key is generated based on the set of at least one classification, and the image is stored based on the set of at least one index key. At 510, the method 500 includes receiving a signal representing a text input from a user. At 512, the method 500 includes performing at least one of (1) retrieval of the image or (2) generation of an alert.

Figure 6:
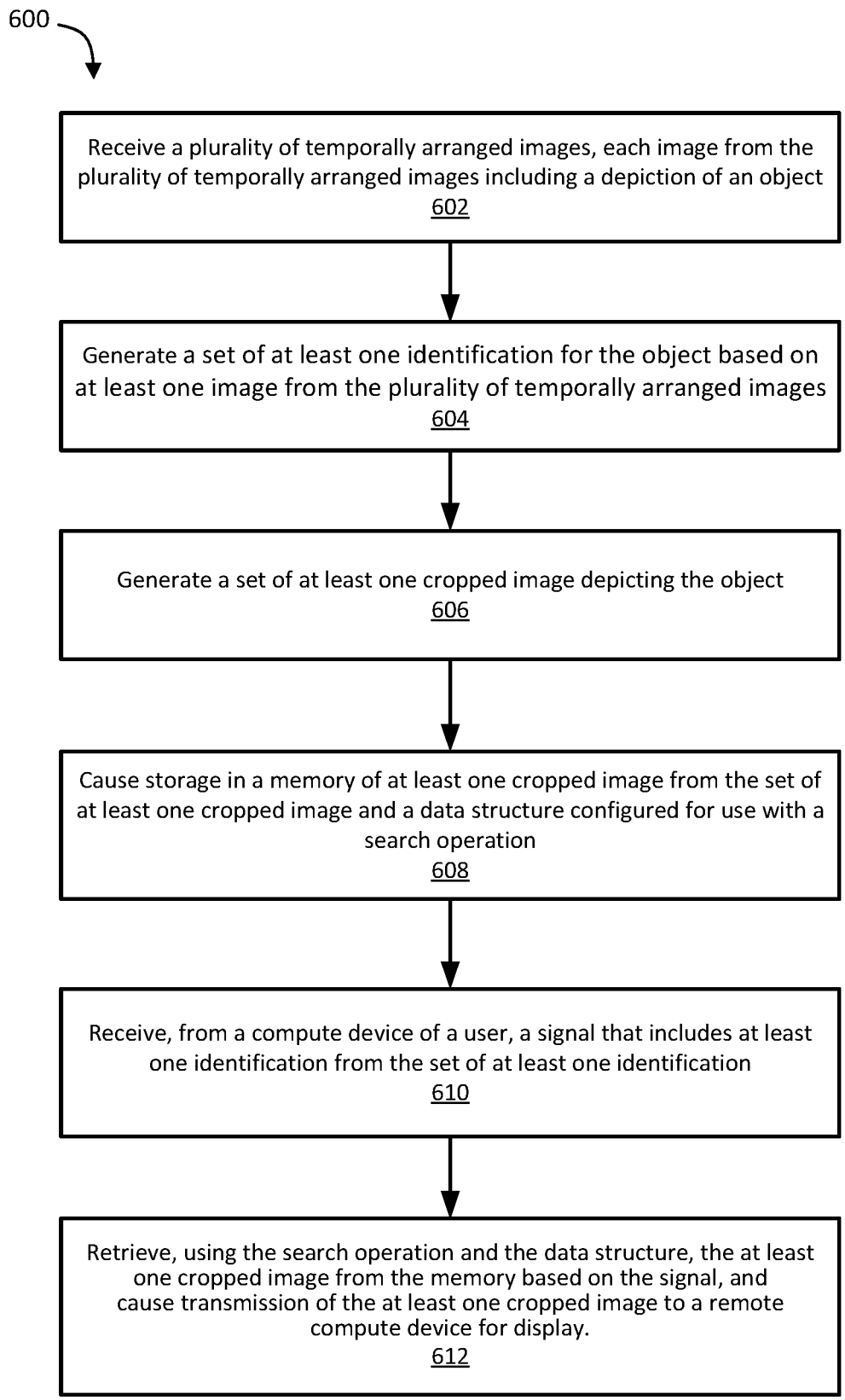
FIG. 6 is a flow diagram showing a second method for generating and selecting images of objects based on video data and text data, according to some embodiments.

FIG. 6 is a flow diagram showing a second method 600 for generating and selecting images of objects based on video data and text data, according to some embodiments. The method 600 can be implemented, for example, using the object detection system 100 of FIG. 1. As shown in FIG. 6, the method 600, at 602, includes receiving, at a processor, a plurality of temporally arranged images, each image from the plurality of temporally arranged images including a depiction of an object. At 604, a set of at least one identification is generated for the object based on at least one image from the plurality of temporally arranged images. At 606, and in response to generating the set of at least one identification, the processor generates a set of at least one cropped image depicting the object. At 608, and in response to the generating at 606, the method 600 includes causing storage in a memory of at least one cropped image from the set of at least one cropped image and a data structure configured for use with a search operation. At 610, a signal that includes at least one identification from the set of at least one identification is received by the processor from a compute device of a user. At 612, the processor retrieves, using the search operation and the data structure, the at least one cropped image from the memory based on the signal, and causes transmission of the at least one cropped image to a remote compute device for display.

Figure 7:
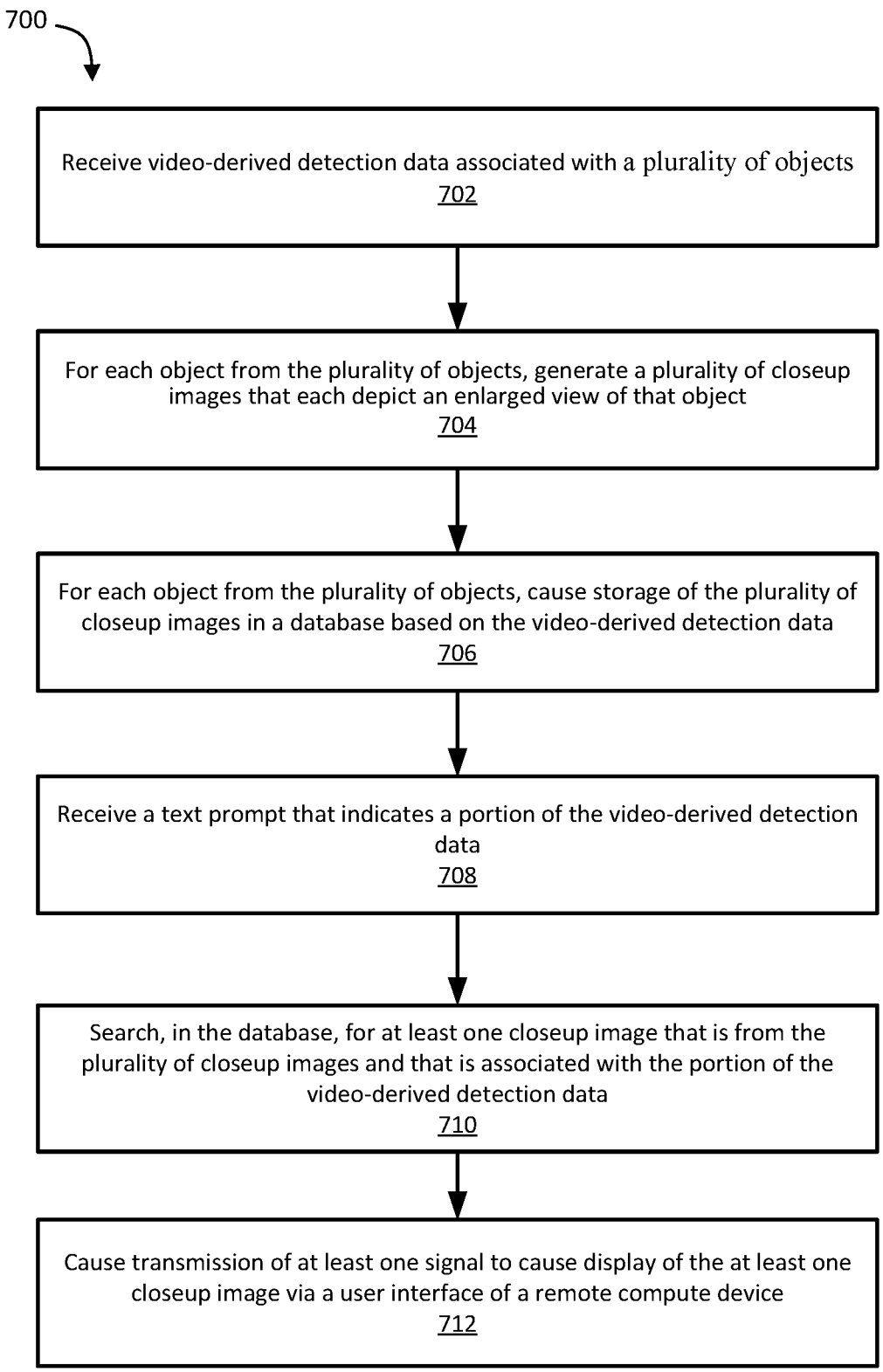
FIG. 7 is a flow diagram showing a third method for generating and selecting images of objects based on video data and text data, according to some embodiments.

FIG. 7 is a flow diagram showing a third method 700 for generating and selecting images of objects based on video data and text data, according to some embodiments. The method 700 can be implemented, for example, using the object detection system 100 of FIG. 1. As shown in FIG. 7, the method 700, at 702, includes receiving, at a processor, video-derived detection data associated with an object. At 704, for each object from the plurality of objects, the processor generates a plurality of closeup images that each depict an enlarged view of that object. additionally, for each object and at 706, the processor causes storage of the plurality of closeup images in a database based on the video-derived detection data. At 708, the method 700 includes receiving a text prompt that indicates a portion of the video-derived detection data. At 710, the processor searches, in the database, for at least one closeup image that is from the plurality of closeup images and that is associated with the portion of the video-derived detection data. At 712, the processor causes transmission of at least one signal to cause display (e.g., via a user interface of a remote compute device) of the at least one closeup image.

In some embodiments, an apparatus includes a processor and a memory operably coupled to the processor. The memory stores instructions to cause the processor to receive a video stream including a series of video frames and to generate a classification for an object depicted in at least one video frame from the series of video frames. The memory also stores instructions to cause the processor to generate an image that depicts the object and that includes a cropped portion of a video frame from the series of video frames. The memory also stores instructions to cause the processor to generate a set of at least one index key based on the set of at least one classification. Additionally, the memory stores the image based on the set of at least one index key. The memory also receives a signal representing a text input from a user, and performs at least one of (1) retrieval of the image based on (a) at least one index key from the set of at least one index key and (b) the text input, or (2) generation of an alert based on (a) at least one classification from the set of at least one classification and (b) the text input.

In some implementations, the apparatus can further include a video camera operably coupled to the processor, the video camera configured to generate the video stream. Alternatively or in addition, in some implementations, the instructions to cause the processor to generate the set of at least one classification can include instructions to generate the set of at least one classification based on a motion associated with the object within at least two video frames from the series of video frames. Alternatively or in addition, in some implementations, the instructions to cause the processor to perform at least one of the retrieval or the generation can include instructions to generate embedded text data associated with a latent space that is associated with the set of at least one classification. The instructions can also include instructions to perform at least one of (1) retrieval of the image based on the embedded text data or (2) generation of an alert based on the embedded text data. Alternatively or in addition, in some implementations, the processor can be configured to use (1) a first neural network to generate the set of least one classification and (2) a second neural network to generate the embedded text data. In some implementations, the second neural network can be at least one of a transformer model or a convolutional neural network.

Alternatively or in addition, in some implementations, the object can be a first object, the at least one video frame can be a first at least one video frame, the set of at least one classification can be a first set of at least one classification, the image can be a first image, the at least one image can be a first at least one image, the cropped portion can be a first cropped portion, the set of at least one index key can be a first set of at least one index key, the video frame can be a first video frame, and the memory can further store instructions to cause the processor to classify a second object depicted in at least one of (1) the first at least one video frame from the series of video frames or (2) a second at least one video frame from the series of video frames, to define a second set of at least one classification. The instructions can further cause the processor to generate a second image that depicts the second object and that includes a second cropped portion of at least one of the first video frame or a second video frame from the series of video frames. The instructions can further cause the processor to generate a second set of at least one index key based on the set of at least one second classification. The instructions can further cause the processor to store the second image based on the second set of at least one index key.

Alternatively or in addition, in some implementations, the text input can be a first text input, and the memory can further store instructions to cause the processor to receive a signal representing a second text input from the user. The instructions can further cause the processor to retrieve the second image based on each of the first text input, the second text input, the first set of at least one classification, and the second set of at least one classification. Alternatively or in addition, in some implementations, the first text input can describe a class that includes a plurality of objects. The second text input can describe a subclass that includes at least one object from the plurality of objects, the subclass being a subset of the class. Alternatively or in addition, in some implementations, the memory can further store instructions to cause the processor to cause transmission of the image to at least one remote compute device based on at least one of the retrieval or the alert. Alternatively or in addition, in some implementations, the memory can further store instructions to cause the processor to generate a security domain-specific supervising signal based on the image and using a neural network. The generation of the alert can be based on the security domain-specific supervising signal, the at least one classification from the set of at least one classification, and the text input.

Alternatively or in addition, in some implementations, the set of at least one classification can include a classification associated with an activity that is (1) performed by the object and (2) depicted in a plurality of video frames from the series of video frames. The text input can include a description of the activity. Alternatively or in addition, in some implementations, the memory can further store instructions to cause the processor to store a plurality of video frames that includes the at least one video frame. The instructions can also cause the processor to retrieve the plurality of video frames based on (a) at least one index key from the set of at least one index key and (b) the text input.

In some embodiments, a non-transitory, processor-readable medium stores instructions that, when executed by a processor, cause the processor to receive a plurality of temporally arranged images, each image from the plurality of temporally arranged images including a depiction of an object. The non-transitory, processor-readable medium also stores instructions to generate a set of at least one identification for the object based on at least one image from the plurality of temporally arranged images. The non-transitory, processor-readable medium also stores instructions to generate a set of at least one cropped image, each cropped image from the set of at least one cropped image including a region of an image from the plurality of temporally arranged images and from a plurality of regions of that image, the image being different from each remaining image from the plurality of temporally arranged images, the region being smaller than an entirety of the image and depicting the object. The non-transitory, processor-readable medium also stores instructions to cause storage, in a memory operably coupled to the processor, of at least one cropped image from the set of at least one cropped image and a data structure that is (1) configured for use with a search operation, and (2) associated with a plurality of identifications that includes the set of at least one identification. Additionally, The non-transitory, processor-readable medium stores instructions to receive, from a compute device of a user, a signal that includes at least one identification from the set of at least one identification. The non-transitory, processor-readable medium also stores instructions to retrieve, using the search operation and the data structure, the at least one cropped image from the memory based on the signal. The non-transitory, processor-readable medium also stores instructions to cause transmission of the at least one cropped image to a remote compute device for display.

Alternatively or in addition, in some implementations, the plurality of temporally arranged images can include images generated by at least one sensor of a video camera. Alternatively or in addition, in some implementations, the non-transitory, processor-readable medium can further store instructions to cause the processor to cause transmission of an alert to the compute device of the user in response to the signal. Alternatively or in addition, in some implementations, the set of at least one identification can be associated with first embedded data, and the signal is associated with second embedded data. Additionally, the search operation can retrieve the at least one cropped image based on a comparison between the first embedded data and the second embedded data. Alternatively or in addition, in some implementations, the set of at least one identification can be generated based on a motion associated with the object within at least two images from the plurality of temporally arranged images. Alternatively or in addition, in some implementations, the set of at least one identification can be generated using a neural network and a plurality of images from the plurality of temporally arranged images, and the set of at least one identification can indicate an action.

Alternatively or in addition, in some implementations, the instructions to retrieve the at least one cropped image can include instructions to retrieve a plurality of cropped images from the memory based on the signal, the plurality of cropped images being associated with the data structure and the set of at least one identification. Alternatively or in addition, in some implementations, the signal can be a first signal, the at least one identification from the set of at least one identification can be at least one first identification from a set of a plurality of identifications, and the non-transitory, processor-readable medium can further store instructions to cause the processor to receive a second signal associated with the at least one first identification and at least one second identification from the set of a plurality of identifications. The instructions can further cause processor to select a subset of at least one cropped image from the plurality of cropped images based on the second signal, the subset of at least one cropped image being associated with the at least one second identification. Alternatively or in addition, in some implementations, the signal can be a first signal, and the non-transitory, processor-readable medium can further store instructions to cause the processor to receive a second signal associated with a time period. The instructions to retrieve the at least one cropped image can include instructions to retrieve the at least one cropped image from the memory based on the first signal and the second signal.

In some embodiments, a non-transitory, processor-readable medium storing instructions that, when executed by a processor, cause the processor to receive video-derived detection data associated with a plurality of objects. For each object from the plurality of objects, the non-transitory, processor-readable medium stores instructions to (1) generate a plurality of closeup images, each closeup image from the plurality of closeup images depicting an enlarged view of that object, and (2) cause storage of the plurality of closeup images in a database based on the video-derived detection data. The non-transitory, processor-readable medium also stores instructions to receive a text prompt that indicates a portion of the video-derived detection data, and search, in the database, for at least one closeup image that is from the plurality of closeup images and that is associated with the portion of the video-derived detection data. The non-transitory, processor-readable medium also stores instructions to cause transmission of at least one signal to cause display of the at least one closeup image via a user interface of a remote compute device.

Alternatively or in addition, in some implementations, the video-derived detection data can include at least one feature of each object from the plurality of objects, and each feature from the at least one feature can be arranged as a feature vector. Alternatively or in addition, in some implementations, the non-transitory, processor-readable medium can further store instructions to cause the processor to generate, using a neural network, embedded data based on the text prompt. Alternatively or in addition, in some implementations, the neural network can include at least one of a transformer model or a convolutional neural network. Alternatively or in addition, in some implementations, the instructions to search can include instructions to determine that the embedded data is substantially equivalent to the portion of the video-derived detection data. Alternatively or in addition, in some implementations, the at least one signal can be a first at least one signal, and the non-transitory, processor-readable medium can further store instructions to cause the processor to cause transmission of at least one second signal to cause an alert based on the video-derived detection data and the text prompt.

Alternatively or in addition, in some implementations, the text prompt can be a first text prompt, the at least one closeup image can be a subset of selected closeup images from the plurality of closeup images, and the at least one signal can be at least one first signal. The non-transitory, processor-readable medium can further store instructions to cause the processor to receive a second text prompt that indicates a subset of the portion of the video-derived detection data. The non-transitory, processor-readable medium can further store instructions to select at least one specific closeup image that is from the subset of selected closeup images and that is associated with the subset of the portion of the video-derived detection data. Additionally, the non-transitory, processor-readable medium can further store instructions to cause transmission of at least one second signal to cause display of the at least one specific closeup image via the user interface of the remote compute device. Alternatively or in addition, in some implementations, the non-transitory, processor-readable medium can further store instructions to cause the processor to receive an indication of a threshold time, and search, in the database, for at least one fresh closeup image that is from the plurality of closeup images and that is associated with (1) the portion of the video-derived detection data and (2) a timestamp indicating a time that is after the threshold time.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

As used herein, in particular embodiments and unless stated otherwise, the terms "about" "substantially" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
a processor; and
a memory operably coupled to the processor, the memory storing instructions to cause the processor to:
receive a video stream including a series of video frames;
generate a set of at least one classification associated with an object depicted in at least one video frame from the series of video frames;
generate an image that depicts the object and that includes a cropped portion of a video frame from the series of video frames;
generate a set of at least one index key based on the set of at least one classification;
store the image based on the set of at least one index key;
receive a signal representing a text input from a user; and
perform at least one of (1) retrieval of the image based on (a) at least one index key from the set of at least one index key and (b) the text input, or (2) generation of an alert based on (a) at least one classification from the set of at least one classification and (b) the text input.

2. The apparatus of claim 1, further comprising a video camera operably coupled to the processor, the video camera configured to generate the video stream.

3. The apparatus of claim 1, wherein the instructions to cause the processor to generate the set of at least one classification include instructions to generate the set of at least one classification based on a motion associated with the object within at least two video frames from the series of video frames.

4. The apparatus of claim 1, wherein the instructions to cause the processor to perform at least one of the retrieval or the generation include instructions to:
generate embedded text data associated with a latent space that is associated with the set of at least one classification; and
perform at least one of (1) retrieval of the image based on the embedded text data or (2) generation of an alert based on the embedded text data.

5. The apparatus of claim 4, wherein the processor is configured to use (1) a first neural network to generate the set of at least one classification and (2) a second neural network to generate the embedded text data.

6. The apparatus of claim 5, wherein the second neural network includes at least one of a transformer model or a convolutional neural network.

7. The apparatus of claim 1, wherein the object is a first object, the at least one video frame is a first at least one video frame, the set of at least one classification is a first set of at least one classification, the image is a first image, the image is a first image, the cropped portion is a first cropped portion, the set of at least one index key is a first set of at least one index key, the video frame is a first video frame, and the memory further stores instructions to cause the processor to:
classify a second object depicted in at least one of: (1) the first at least one video frame from the series of video frames or (2) a second at least one video frame from the series of video frames, to define a second set of at least one classification;
generate a second image that depicts the second object and that includes a second cropped portion of at least one of the first video frame or a second video frame from the series of video frames;
generate a second set of at least one index key based on the second set of at least one classification; and
store the second image based on the second set of at least one index key.

8. The apparatus of claim 7, wherein the text input is a first text input, and the memory further stores instructions to cause the processor to:
receive a signal representing a second text input from the user; and
retrieve the second image based on each of the first text input, the second text input, the first set of at least one classification, and the second set of at least one classification.

9. The apparatus of claim 8, wherein:
the first text input describes a class that includes a plurality of objects; and
the second text input describes a subclass that includes at least one object from the plurality of objects, the subclass being a subset of the class.

10. The apparatus of claim 1, wherein the memory further stores instructions to cause the processor to cause transmission of the image to at least one remote compute device based on at least one of the retrieval or the alert.

11. The apparatus of claim 1, wherein:
the memory further stores instructions to cause the processor to generate a security domain-specific supervising signal based on the image and using a neural network; and
the generation of the alert is based on the security domain-specific supervising signal, the at least one classification from the set of at least one classification, and the text input.

12. The apparatus of claim 1, wherein:
the set of at least one classification includes a classification associated with an activity that is (1) performed by the object and (2) depicted in a plurality of video frames from the series of video frames; and
the text input includes a description of the activity.

13. The apparatus of claim 1, wherein the memory further stores instructions to cause the processor to:
store a plurality of video frames that includes the at least one video frame; and
retrieve the plurality of video frames based on (a) at least one index key from the set of at least one index key and (b) the text input.

14. A non-transitory, processor-readable medium storing instructions that, when executed by a processor, cause the processor to:
receive a video stream including a series of video frames;
generate a set of at least one classification associated with an object depicted in at least one video frame from the series of video frames;
generate an image that depicts the object and that includes a cropped portion of a video frame from the series of video frames;
generate a set of at least one index key based on the set of at least one classification;
store the image based on the set of at least one index key;
receive a signal representing a text input from a user; and
perform at least one of (1) retrieval of the image based on (a) at least one index key from the set of at least one index key and (b) the text input, or (2) generation of an alert based on (a) at least one classification from the set of at least one classification and (b) the text input.

15. The non-transitory, processor-readable medium of claim 14, wherein the instructions to cause the processor to receive the video stream include instructions to receive the video stream from a video camera that is operably coupled to the processor and configured to generate the video stream.

16. The non-transitory, processor-readable medium of claim 14, wherein the instructions to cause the processor to generate the set of at least one classification include instructions to generate the set of at least one classification based on a motion associated with the object within at least two video frames from the series of video frames.

17. The non-transitory, processor-readable medium of claim 14, wherein the instructions to cause the processor to perform at least one of the retrieval or the generation include instructions that, when executed by the processor, cause the processor to:
generate embedded text data associated with a latent space that is associated with the set of at least one classification; and
perform at least one of (1) retrieval of the image based on the embedded text data or (2) generation of an alert based on the embedded text data.

18. The non-transitory, processor-readable medium of claim 17, wherein:
the instructions to generate the set of at least one classification include instructions to generate the set of at least one classification using a first neural network; and
the instructions to generate the embedded text data include instructions to generate the embedded text data using a second neural network.

19. The non-transitory, processor-readable medium of claim 17, wherein the instructions to generate the embedded text data include instructions to generate the embedded text data using a neural network that includes at least one of a transformer model or a convolutional neural network.

20. The non-transitory, processor-readable medium of claim 14, wherein the object is a first object, the at least one video frame is a first at least one video frame, the set of at least one classification is a first set of at least one classification, the image is a first image, the image is a first image, the cropped portion is a first cropped portion, the set of at least one index key is a first set of at least one index key, the video frame is a first video frame, the non-transitory, processor-readable medium further storing instructions that, when executed by the processor, cause the processor to:

classify a second object depicted in at least one of: (1) the first at least one video frame from the series of video frames or (2) a second at least one video frame from the series of video frames, to define a second set of at least one classification;

generate a second image that depicts the second object and that includes a second cropped portion of at least one of the first video frame or a second video frame from the series of video frames;

generate a second set of at least one index key based on the second set of at least one classification; and store the second image based on the second set of at least one index key.

\* \* \* \* \*